United States Patent [19]

Anderson et al.

[11] 4,343,675

[45] Aug. 10, 1982

[54] METHOD OF MANUFACTURING HOLLOW MEMBERS HAVING UNIFORM WALL THICKNESS THROUGH USE OF ABLATION

[75] Inventors: Paul R. Anderson, Toledo, Ohio; Raymond L. Downs; Timothy M. Henderson, both of Ann Arbor,, Mich.

[73] Assignee: The United States of America as represented by the United States Department of Energy, Washington, D.C.

[21] Appl. No.: 192,272

[22] Filed: Sep. 30, 1980

[51] Int. Cl.³ .............................................. C03C 15/02
[52] U.S. Cl. .................................... 156/628; 65/30.1; 65/30.13; 65/31; 156/643; 156/644; 156/663
[58] Field of Search ........................ 156/628, 643, 644; 65/30 R, 30 E, 31, 30.1, 30.13

[56] References Cited

U.S. PATENT DOCUMENTS

| | | | |
|---|---|---|---|
| 3,325,319 | 6/1967 | Frantzen | 156/644 |
| 3,560,280 | 2/1971 | Nishida | 156/628 |
| 3,650,743 | 3/1972 | Hallman | 156/628 |
| 3,802,972 | 4/1974 | Fleischer et al. | 156/628 |
| 3,808,068 | 4/1974 | Johnson et al. | 156/628 |
| 3,853,648 | 12/1974 | Janus et al. | 156/628 |
| 4,092,209 | 5/1978 | Ipri | 156/628 |
| 4,093,503 | 6/1978 | Harris et al. | 156/628 |
| 4,108,715 | 8/1978 | Ishikawa et al. | 156/628 |

*Primary Examiner*—James C. Cannon
*Attorney, Agent, or Firm*—John A. Koch; Richard G. Besha; James E. Denny

[57] ABSTRACT

A method of manufacturing a hollow structure of uniform wall thickness comprising the steps of selecting or forming a precursor having one wall surface of desired geometry, treating a portion of the precursor consisting of the one wall surface and a uniform depth of material beneath the wall surface to increase resistance to ablation, and then removing by ablation and discarding the remaining or untreated portion of the precursor.

29 Claims, 7 Drawing Figures

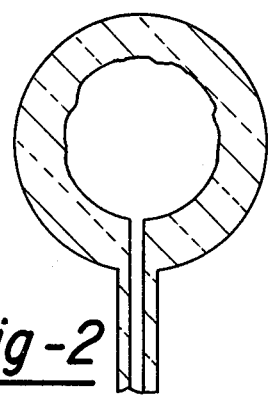
Fig-2
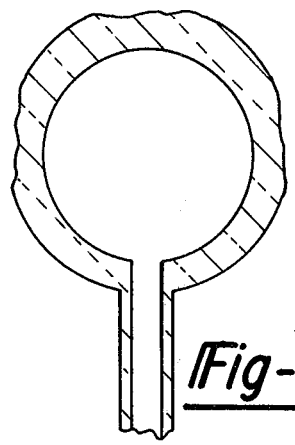
Fig-5
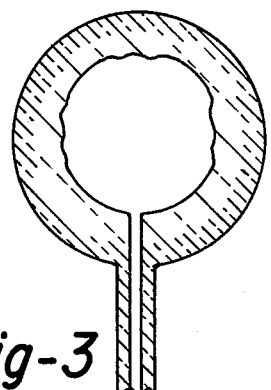
Fig-3
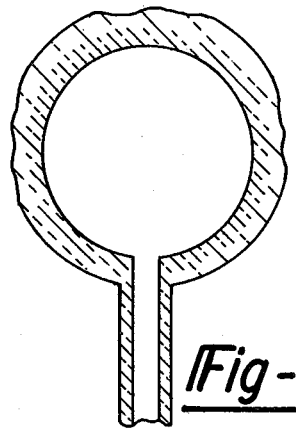
Fig-6
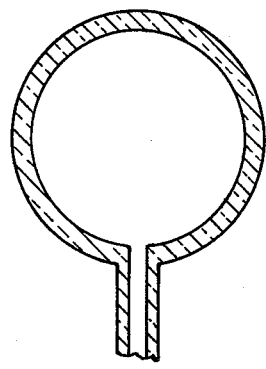
Fig-4
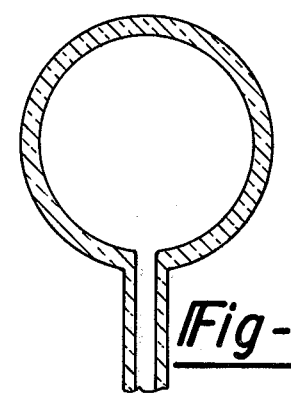
Fig-7
FORM OR SELECT A PRECUSOR
↓
TREAT FOR ABLATION RESISTANCE
↓
ABLATE UNTREATED PORTION
Fig-1

METHOD OF MANUFACTURING HOLLOW MEMBERS HAVING UNIFORM WALL THICKNESS THROUGH USE OF ABLATION

The present invention relates to methods of manufacturing hollow members, such as macrospheres and tubes, and more particularly to a method for manufacturing such members so as to possess a uniform geometry and wall thickness from a precursor member having one wall surface of desired geometry and dimension.

BACKGROUND OF THE INVENTION

Use of hollow spherical shells as fuel containers in the inertial confinement fusion field has demonstrated a number of advantages well recognized in the art. In the case of glass shells in particular, these advantages include transparency, high strength, high permeability to hydrogen fuel at moderate temperatures and low hydrogen permeability at room temperature. These and other advantages are also demonstrated to a greater or lesser extent by shells of polymeric and metallic construction. One essential requirement for any fuel-containing shell in ICF applications is wall uniformity—i.e. uniform spherical geometry and uniform thickness. These requirements have been met in manufacture of microspheres (diameter equal to or less than about 2 mm.), particularly in the case of glass microspheres. See the U.S. Pat. to Burdick et al Nos. 4,017,290 and 4,021,253. However, the requirement of wall uniformity is only poorly met for larger fuel containers, such as glass macrospheres (diameter greater than about 2 mm.) blown by hand or machine. Similar problems inhere in production of tubular members, including particularly capillary tubes, having uniform wall geometry and thickness.

OBJECTS AND SUMMARY OF THE INVENTION

An object of the invention is to provide a method of manufacturing hollow members, particularly hollow macrospheres and tubes, having uniform wall geometry and wall thickness.

A more particular object of the invention is to provide a method of altering or tailoring wall uniformity of a hollow precursor member having at least one wall surface of desired geometry and greater-than-desired wall thickness.

A further and more specific object of the invention is to provide a method of manufacturing capillary bulbs of glass, polymeric or metallic construction having spherical bulb walls of uniform geometry and thickness.

These and other objects are accomplished in accordance with the invention by first forming or selecting as a precursor a hollow object of desired gross outline and having at least one wall surface of desired geometry or dimension. In the case of a macroshell or capillary bulb, such surface may be either the inner or outer spherical wall surface. Similarly, in the case of a tubular member, the selected surface may be either the inner or outer "cylindrical" wall surface. In either case, the selected surface should have a uniform diameter equal to the desired final diameter. The wall thickness extending radially from the selected wall surface to the opposing wall surface must be at all locations equal to or greater than the desired final wall thickness.

A portion of the object, consisting of the selected wall surface and a uniform depth of material beneath the selected surface, is then treated so as to alter the composition or microstructure of the treated portion, and thereby render that portion more resistant to ablation or removal in a predetermined subsequent operation. In a preferred example of the subject method for construction of silicate glass macroshells in the form of capillary bulbs, the glass composition to a uniform depth beneath the selected shell wall surface is dealkalized by subjecting the selected shell surface to an acid gas mixture such as a sulfur oxide and air. The opposing wall surface is then subjected to an ablation process, such as a chemical etchant in the case of glass, to remove the untreated portion of the object. The resulting product has a uniform geometry and wall thickness resulting from the starting uniformity of the selected wall surface and the uniform depth of penetration during the anti-ablation treatment, and a more or less (substantially) uniform material composition corresponding to the material composition following the anti-ablation treatment.

BRIEF DESCRIPTION OF THE DRAWINGS

FIG. 1 is a block diagram illustrating a presently preferred embodiment of the three-step process in accordance with the invention;

FIGS. 2–4 are sectional views of capillary bulbs and illustrate one application of the process of FIG. 1; and FIGS. 5–7 are sectional views of capillary bulbs and illustrate a second application of the process of FIG. 1.

DETAILED DESCRIPTION OF PREFERRED EMBODIMENTS

Referring to the drawing, the process of the invention (FIG. 1) contemplates selection or formation of a hollow precursor having one wall of desired geometry. In the case of capillary bulbs of glass or polymeric material, the shells with integrally attached capillary stems (as shown in the drawing) may be hand or machine blown or fabricated utilizing other conventional techniques. Alternatively, the shells may be separately formed utilizing conventional techniques, and the capillary stem may be subsequently attached thereto so as to communicate with a hole drilled or otherwise formed in the shell wall. Metal capillary bulbs may be formed by blowing a bulb on the end of a metal capillary tube heated to a temperature above the melting point of the metal. Alternatively, a capillary tube may be sealed to a hollow metal shell possessing an orifice of the proper size. Hollow metal shells are formed, for example, during molten metal atomization. A critical requirement in accordance with the invention is that the selected or formed precursor have either an inside or an outside wall surface of desired dimension and geometry, and that the wall thickness of the precursor measured in the radial direction be at least equal in all places to the desired ultimate wall thickness. Use of a capillary bulb precursor having an outer wall of desired geometry in practice of the invention is illustrated on the left in the drawing in FIGS. 2–4 adjacent corresponding steps in the illustration of FIG. 1, and use of a bulb precursor having an inner wall surface of desired configuration is illustrated on the right in FIGS. 5–7.

The selected wall surface of the precursor (FIG. 2 or 5) is then treated to a uniform depth beneath the wall surface so as to increase resistance of the treated portion to ablation. (Throughout the application and claims, the term "ablation" is utilized in a generic sense to refer to any non-mechanical process for removing material to which susceptibility will vary with material composition and/or microstructure.) In practice of the invention for construction of uniform capillary bulbs of silicate glass, such treatment may be accomplished by subjecting the selected surface at a temperature less than the softening temperature of the glass to a dealkalization agent such as a sulfur trioxide, sulfur dioxide in a mixture with air, a fluorocarbon in air, or mixtures thereof. The lower temperature limit is determined by affecting a reasonable rate of dealkalization, 300° C. being a practical lower limit. For dealkalization at high temperature to a depth greater than 1 $\mu$m, a silicate glass precursor containing alkali oxides (particularly soda) in excess of five weight percent and aluminum oxides in excess of five weight percent is preferred. Dealkalization to depths of 50 $\mu$m has been achieved with the most preferred silicate glass containing oxides of sodium in the amount of about twenty-five weight percent and oxides of aluminum in the amount of about fifteen weight percent. It has been found that uniformity of dealkalization is quite good for the latter composition, and that depth of penetration can be readily controlled by adjusting the time, concentration of the acid gas in the treating atmosphere and/or temperature of treatment.

The treated portions of the precursor bulbs are illustrated by denser crosshatching in FIGS. 3 and 6 of the drawing. The exterior portion of the bulb (FIG. 3) may be treated by sealing the end of the capillary stem and subjecting the entire bulb to the treating atmosphere. The interior bulb wall (FIG. 6) may be treated by attaching the capillary stem to a manifold in which the treating gas mixture is flowing, such that the treating mixture flows into contact with the bulb interior by capillary action through the open capillary stem.

At least the untreated portion of the precursor or, optionally, the entire object is then subjected to an ablation process. In the case of silicate glass, such ablation process may take the form of a chemical etchant such as an aqueous hydrogen fluoride (hydrofluoric acid). The untreated portion of the capillary bulb is removed by the etchant and discarded, leaving the ablation-resistant treated portion of the bulb. The untreated external surface of a bulb (FIG. 6) may be ablated by exposure to etchant solution, while the internal surface (FIG. 3) may be ablated by evacuating the bulb while its capillary stem is immersed in the etchant and then pressurizing to force etchant into the bulb. The etchant solution containing the ablated material can be removed from the bulb subsequently by another evacuation. The final bulbs are shown in FIGS. 5 and 7.

The invention has been described in detail in connection with silicate glass capillary bulbs. However, the invention also contemplates other precursor materials and/or ablation-resistant treatment. For example, the selected surface of a glass precursor may be subjected to an ion exchange process as by exposing the selected surface to a source of ions in a salt bath. The selected surface may be subjected to an ion implantation process, such as by exposure to uniform irradiation from a high energy source of ion beams. Note that all of such processes alter the material composition of the ablation-resistant layer. In each case, a chemical etchant may be used for removal of untreated glass.

The precursor may be of polymeric construction, in which case the step of treating for ablation resistance would preferably be one which induces crosslinking in the treated portion of the precursor. Such may be accomplished photolithographically by uniformly exposing the selected surface to electromagnetic irradiation, or by uniform exposure to beta particle irradiation such as would be provided by exposure to a radioactive gas. Note that this would involve a change in microstructure by crosslinking, but no alteration of material composition. Alternatively, a crosslinking agent may be diffused into the selected surface. Treatment may also take the form of ion implantation to induce crosslinking, as by uniform exposure to a high energy ion source. Each such treatment promotes alteration of microstructure by crosslinking of polymer chains (as well as alteration of composition in the latter two examples) so as to render the treated portion of the precursor resistant to ablation by chemical etchant, pyrolysis and/or vaporization. The precursor may also be of metal construction, in which case the ablation-resistance treatment may take the form of metal diffusion (alloying), ion implantation and/or surface hardening so as to resist ablation by chemical etchant.

Although the invention has been illustrated and described in detail as applied to capillary bulbs of the type which comprise hollow macrospheres with attached capillary stems, it will be recognized that the invention may be readily applied to other types of hollow structures, including specifically tubes such as capillary tubes.

What is claimed is:

1. A method of producing hollow objects having interior and exterior wall surfaces of predetermined uniform geometry separated by material of uniform desired thickness extending between said surfaces, said method comprising the steps of:
   (a) selecting as a precursor a hollow object having one said wall surface of desired geometry and dimension, and a thickness between said one surface and the other of said surfaces at all points no less than said desired thickness,
   (b) treating a portion of said precursor consisting of said one surface and a uniform depth of material beneath said one surface corresponding to said desired thickness so as to increase resistance of said portion to ablation, and then
   (c) removing the remainder of said precursor unaffected in said step (b) by subjecting said other surface to an ablation process to leave a product having a uniform thickness corresponding to said depth of material beneath said one surface and a uniform geometry corresponding to said desired geometry of said one wall surface and said uniform thickness.

2. The method set forth in claim 1 wherein said step (b) comprises the step of compositionally altering said portion of said precursor, and wherein said step (c) comprises the step of chemically etching the said remainder of said precursor.

3. The method set forth in claim 2 wherein said step (b) comprises the step of diffusing an etch-resistant agent into said one surface to said uniform depth.

4. The method set forth in claim 3 wherein said step (b) comprises the step of subjecting said precursor one surface to an environment in which said etch-resistant agent is a constituent.

5. The method set forth in claim 2 wherein said step (b) comprises the step of ion-implanting said etch-resistant agent by subjecting said one surface to a uniform ionic concentration.

6. The method set forth in claim 5 wherein said step (b) comprises the step of directing ion beams uniformly onto said one surface.

7. The method set forth in claim 5 wherein said step (b) comprises the step of subjecting said one surface to an atmosphere containing a radioactive constituent.

8. The method set forth in claim 1 wherein said step (b) comprises the step of altering the microstructure of said portion of said precursor without changing material composition of said precursor.

9. The method set forth in claim 8 wherein said precursor is constructed of polymeric material, and wherein said step (b) comprises the step of inducing crosslinking said polymeric material to said uniform depth beneath said one surface.

10. The method set forth in claim 9 wherein said crosslinking is accomplished by uniformly subjecting said one surface to radiant energy.

11. The method set forth in claim 9 wherein said crosslinking is accomplished by diffusing into said one surface to said uniform depth a selected crosslinking agent.

12. The method set forth in claim 10 or 11 wherein said step (c) comprises the step of chemically etching the remainder of said precursor.

13. The method set forth in claim 10 or 11 wherein said step (c) comprises the step of pyrolyzing said remainder of said precursor.

14. The method set forth in claim 10 or 11 wherein said step (c) comprises the step of vaporizing said remainder of said precursor.

15. The method set forth in claim 1 wherein said precursor is constructed of metallic material, and wherein said step (b) comprises the step of altering the composition of said portion of said precursor by alloying said precursor to said uniform depth beneath said one surface.

16. The method set forth in claim 1 wherein said precursor is constructed of metallic composition, and wherein said step (b) comprises the step of altering the microstructure of said portion of said precursor by hardening said portion without altering material composition of said portion.

17. The method set forth in claim 15 or 16 wherein said step (c) comprises the step of chemically etching said remainder of said precursor.

18. The method set forth in claim 1 wherein said precursor is constructed of silicate glass composition, and wherein said step (c) comprises the step of chemically etching said remainder of said precursor.

19. The method set forth in claim 18 wherein said silicate glass composition includes oxides of alkali metals, and wherein said step (b) comprises the step of reducing alkali metal content of said portion of said precursor by subjecting said one surface to an acid gas treatment.

20. The method set forth in claim 19 wherein said composition includes oxides of sodium in the amount of at least five weight percent and oxides of aluminum in the amount of at least five weight percent.

21. The method set forth in claim 20 wherein said composition includes said oxides of sodium in the amount of about twenty-five percent and said oxides of aluminum in the amount of about fifteen weight percent.

22. The method set forth in claim 20 wherein said acid gas treatment is selected from the group consisting of sulfur trioxide, sulfur dioxide and air, fluorocarbon and air, and mixtures thereof.

23. The method set forth in claim 22 wherein said step (c) is carried out by subjecting at least said other surface to hydrofluoric acid.

24. A method of producing a hollow glass member having interior and exterior wall surfaces and a uniform wall thickness separating said surfaces, said method comprising the steps of
(a) forming a hollow precursor of glass composition including oxides of silica and alkali metals so as to have at least one wall surface of desired dimension and geometry and a precursor wall thickness at least equal to said uniform wall thickness,
(b) subjecting said one wall surface to an acid gas mixture so as to reduce alkali metal content of a portion less than the entirety of said precursor to a uniform depth beneath said one wall surface, such that said portion of said precursor is more resistant to removal by a selected chemical etchant than is the remainder of said precursor, and then
(c) removing the said remainder of said precursor unaffected in step (b) by subjecting the other of said surfaces to said selected chemical etchant.

25. The method set forth in claim 24 wherein said composition includes oxides of sodium in the amount of at least five weight percent and oxides of aluminum in the amount of at least two weight percent.

26. The method set forth in claim 25 wherein said step (b) comprises the step of subjecting said one wall surface at a temperature less than the softening temperature of said composition to an acid gas selected from the group consisting of oxides of sulfur with steam, a fluorocarbon with air and mixtures thereof.

27. The method set forth in claim 25 or 26 wherein said step (c) comprises the step of subjecting said other surface to a hydrofluoric acid etching solution.

28. The method set forth in claim 25 wherein said composition includes said oxides of sodium in the amount of about twenty-five weight percent and said oxides of aluminum in the amount of about fifteen weight percent.

29. The method set forth in claim 27 wherein said step (b) comprises the step of subjecting said one wall surface to a mixture which includes sulfur trioxide.

* * * * *